United States Patent Office 2,770,400
Patented Nov. 13, 1956

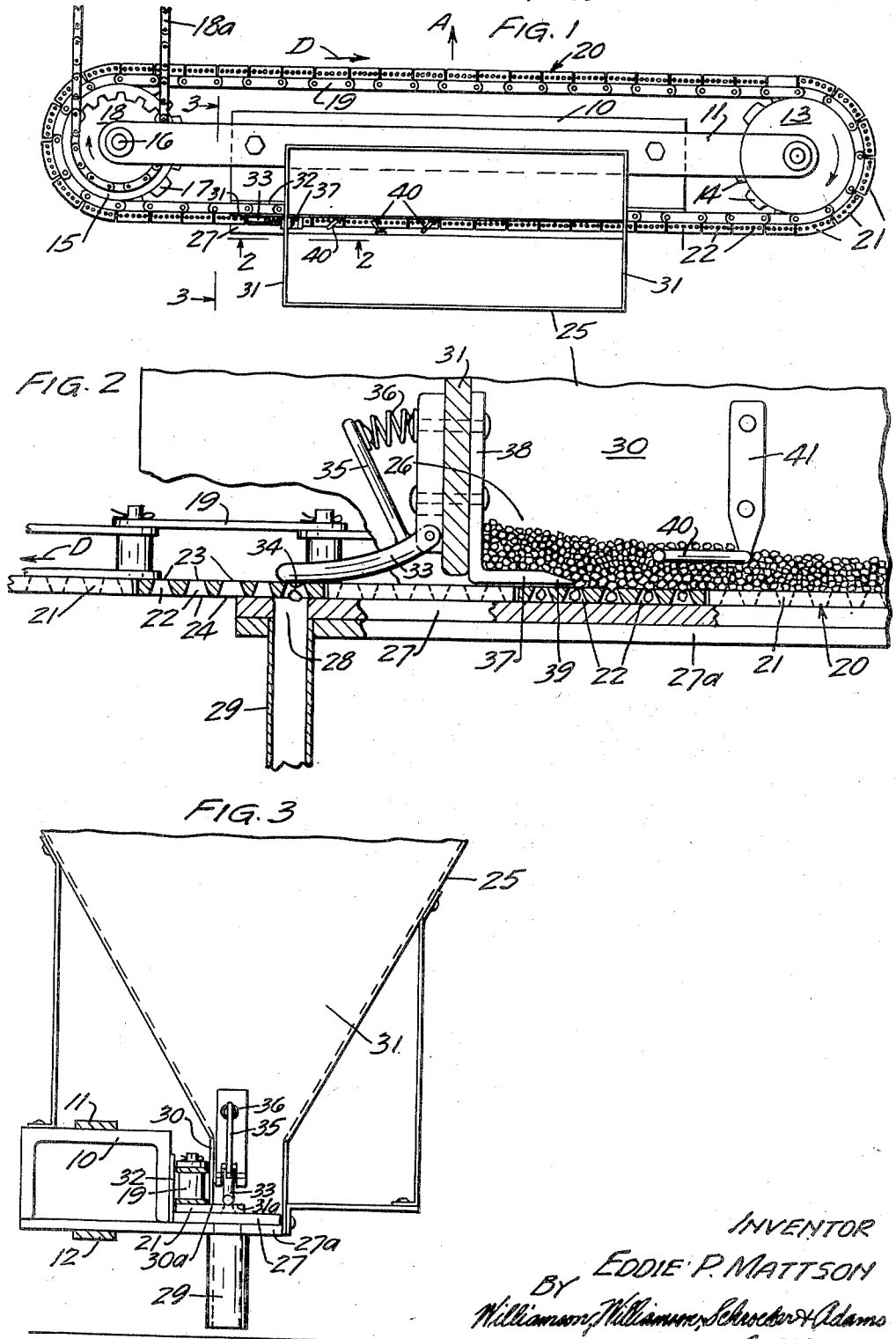

2,770,400

SEED SEPARATING AND FEEDING MECHANISM

Eddie P. Mattson, Grafton, N. Dak.

Application November 18, 1954, Serial No. 469,715

3 Claims. (Cl. 222—222)

This invention relates to machinery for planting seeds of vegetables, such as beets and the like, and more specifically, relates to apparatus for separating seeds from a bulk mass for individually planting the same.

In planting some vegetables, such as beets and the like, the seeds must be positioned in the furrows in regularly spaced relation. Each seed must be at least a predetermined distance from the adjacent seeds to provide for proper growth thereof, and the seeds must be as close together as possible to provide maximum use of the acreage. Although many types of seed separators are employed with various types of planters, many of these separators do not provide a positive control of the rate of feeding of individual seeds from the planter to the furrow in the ground.

Therefore, with the foregoing in mind, it is to the solution of these and other problems that my invention is directed, along with the inclusion therein of other novel and desirable features.

It is a general object of my invention to provide in a seed planter, novel apparatus of relatively simple and inexpensive construction for separating individual seeds from a bulk supply of seeds.

Another object of my invention is to provide in a seed planter, improved apparatus for separating and collecting individual seeds from a bulk supply of seeds and for positively controlling the rate of feeding of collected seeds into the planting furrow.

A further object of my invention is to provide in a seed planter, a new and improved apparatus for separating and collecting individual seeds out of a bulk mass and for positively ejecting the seeds from the collecting apparatus at a proper time to provide for proper positioning of the seeds in the furrows.

These and other objects and advantages of my invention will more fully appear from the following description made in connection with the accompanying drawings wherein like reference characters refer to the same parts throughout the several views and in which:

Fig. 1 is a plan view of my invention;

Fig. 2 is a section view of a portion of my invention, taken on a vertical plane at 2—2 of Fig. 1; and Fig. 3 is a section view of my invention taken on a vertical plane at 3—3 of Fig. 1.

My invention discloses a seed separating and feeding apparatus for use in a seed planter. Frame 10, which may comprise a rigid channel, may be attached to and carried by a tractor or an individual planting unit. The tractor will supply a source of power for operating the apparatus and for carrying or pulling the apparatus in the field. A pair of frame extension members 11 and 12 are affixed to frame 10 and extend longitudinally thereof.

An idler sprocket wheel 13 is journalled between extension members 11 and 12 at one end thereof to rotate in a horizontal plane. Wheel 13 has enlarged gear teeth 14 on the peripheral edge thereof.

Sprocket wheel 15 is fixedly secured to spindle shaft 16 which is journalled between frame extension members 11 and 12 at the opposite end thereof from wheel 13. Wheel 15 is positioned to rotate in the horizontal plane of rotation of wheel 13. Sprocket wheel 15 includes gear teeth 17 on the peripheral edge thereof.

Another sprocket wheel 18 is fixedly secured on shaft 16 to rotate therewith. A power chain 18a may be meshed with wheel 18 for transmitting power thereto from a source of power such as the tractor.

A roller chain 19 or gear chain extends around and is meshed with each of the sprocket wheels 13 and 15 respectively. When power is applied to sprocket 18, the driving mechanism including sprocket wheels 13 and 15 and chain 19 will operate to move chain 19 through a course around the sprockets.

A seed-carrying medium 20 or seed conveyor is secured to chain 19 to move therewith and be carried thereby. Conveyor 20 comprises a plurality of plates 21 which are constructed of a rigid material, such as steel, and are secured, as by welding, to the links of chain 19. Each of the substantially horizontal plates 21 extends outwardly from chain 19 and abuts against adjacent plates 21 when in rectilinear alignment.

Each of the plates 21 has a plurality of substantially aligned seed-receiving chambers 22 formed therein. Chambers 22 are tapered to open upwardly through restricted inlet apertures 23 and to open downwardly through enlarged discharge apertures 24.

A hopper 25 is secured to frame 10 and is positioned above a rectilinear portion of chain 19 and seed conveyor 20. Hopper 25 has a seed delivery portion 26 defined at the lower portion thereof through which seeds are withdrawn from hopper 25. A removable plate 27 or base forms the bottom of hopper 25 and is mounted on a support member 27a which is affixed to frame 10, as by welding. Base 27 extends outwardly of hopper 25 adjacent to the seed delivery portion 26 thereof and has an enlarged opening 28 formed in the outwardly extended end portion thereof. Opening 28 communicates with means such as conveyor tube 29 for carrying seeds to the ground to be deposited in furrows. Base 27 should be positioned as close to the ground as is practical to allow tube 29 to be as short as possible. Conveyor tube 29 may be constructed of a corrosion-resistant material or may be plated with a corrosion-resistant material such as chromium.

The rear wall 30 of hopper 25 has an elongated slot 30a extending throughout one length thereof adjacent to base 27 to allow conveyor 20 to be inserted therethrough. Hopper end walls 31 also have slots 31 adjacent to base 27 to allow plates 21 to pass therethrough. Chain 19 is mounted for sliding movement between rear wall 30 of hopper 25 and frame 10. Conveyor 20 extends through slots 30a and 31a in proximity with the seed delivery portion 26 of hopper 25. Conveyor 20 is mounted in overlying relation with plate 27 and opening 28 for sliding movement relative thereto and to the seed delivery portion 26 of hopper 25. As conveyor 20 slides over plate 27, each of the chambers 22 are aligned with opening 28 to communicate therewith. A wear plate 32 is removably mounted between frame 10 and chain 19.

An ejector element 33 is pivotally mounted on end wall 31 of hopper 25 adjacent to opening 28 of base plate 27. A hemispherical ejector 34 is attached on the outer end of element 33 to be injected into each of the chambers 22 of plates 21 when the chambers 22 shift into alignment with opening 28 of base 27. An upstanding arm 35 is attached to element 33, and a compression spring 36 is interposed between the upper end portion of arm 35 and end wall 31 of hopper 25 to resiliently urge element 33 downwardly and ejector 34 into each of the chambers 22 of conveyor 20.

A seed-engaging baffle member 37 or shoe has an upstanding attaching arm 38 affixed to end wall 31 of hopper 25. Baffle member 37 extends laterally across the slot 31a in end wall 31 and across plate 21. Member 37 has a tapered end portion 39 positioned in closely spaced relation above plate 21.

Several stirring arms 40 are secured to the rear wall 30 of hopper 25 by upstanding support members 41 and are positioned above and in proximity with conveyor 20. Each of the stirring arms 40 extends outwardly and substantially horizontally from the rear wall 30 and extends diagonally over plates 21 and in a divergent direction with relation to adjacent stirring arms 40.

When mounted on a tractor or separate unit, the apparatus will travel in the direction of arrow A and when a source of power is connected to the driving mechanism, the chain 19 will travel in the direction of arrow D around the rotating sprocket wheels 13 and 15 respectively. Chain 19 will move conveyor 20 through the seed delivery portion 26 of hopper 25 which will cause shifting of the seeds contained therein and may cause laminar flow of the seeds adjacent to the moving plates 21. Stirring rods 40 will deflect the shifting seeds adjacent to the plates 21 to cause turbulence in the shifting of the seeds. Such turbulence causes a seed to enter each of the seed-receiving chambers 22 of plates 21. Seeds which travel along on top of plates 21 toward the seed delivery portion 26 of hopper 25 will be deflected by baffle element 37 and the tapered end portion 39 thereof, to be prevented thereby from being withdrawn through slot 31a in end wall 31. In the shown form of this invention, chambers 22 carry only one seed.

As conveyor 20 moves through hopper 25, each of the seed-receiving chambers 22 will successively be aligned with opening 28 in base 27 for discharging the seed carried therein. The enlarged aperture 24 of each of the chambers 22 permits rapid and positive discharging of the seed into opening 28. As each seed-carrying chamber 22 progresses into alignment and communication with opening 28, ejector 34 will be inserted into chamber 22 to strike and impel the seed carried therein downwardly through opening 28. The seed will then fall by gravity through tube 29 to the furrow in the ground. As each of the chambers 22 progresses out of alignment with opening 28, the hemispherical ejector 34 shifts upwardly and plate 21 shifts therebeneath. Conveyor 20 continues around the sprocket wheels to re-enter the hopper 25 again.

The seeds carried by chambers 22 are fed to the opening 28 and ejected therethrough to conveyor tube 29 at a substantially constant predetermined rate. The speed of the traveling chain 19 and of the feeding of seeds through opening 28 may be varied by varying the speed of the power source. The spacing between adjacent seeds deposited in the furrow beneath the conveying tube 29 will vary with the rate at which seeds are fed to the ground and the rate of forward motion of the seed planter and tractor.

It will be seen that I have provided in a seed planter, novel apparatus of relatively simple and inexpensive construction, for separating individual seeds from a bulk supply of seeds by collecting individual seeds in traveling seed-receiving chambers which pass through the bulk supply.

It should also be apparent that I have provided in a seed planter, improved apparatus for separating individual seeds from a bulk supply of seeds and for positively controlling the rate at which successive seeds are supplied to the furrow for planting.

It will also be observed that I have provided in a seed planter, new and improved apparatus for separating and collecting individual seeds out of a bulk mass of seeds and for positively ejecting the collected seeds to the ground.

It should also be noted that I have provided in a seed planter, novel apparatus for separating and collecting individual seeds in seed-receiving chambers and for positively providing for injecting a seed into each chamber passing through a bulk supply of seeds.

It will, of course, be understood that various changes may be made in the form, details, arrangement and proportions of the parts without departing from the scope of my invention which consists of the matter shown and described herein and set forth in the appended claims.

What I claim is:

1. In a seed planter the combination of a frame, a seed-carrying hopper having a bottom and having generally upright side walls defining a diminished seed-delivery portion adjacent said bottom, each of said side walls having an inner side and an outer side, one of said side walls having an elongated slot extending horizontally throughout the length thereof and adjacent said bottom, an elongated, flexible driving element extending horizontally along said last mentioned side wall and adjacent said slot therein, engaging means mounted on said frame and connected with said flexible element for guiding the same, said engaging means being adapted for connection with a source of power for driving said flexible element, a flat seed-delivery conveyor secured to said flexible driving element and extending laterally outwardly therefrom and inwardly of said hopper through said slot, said conveyor being supported on said bottom and having a plurality of seed-receiving chambers each communicating with the interior of said hopper for receiving a seed therefrom, and delivery means mounted on said frame and being operatively connected with said conveyor for receiving seeds therefrom and delivering the same to the ground for planting.

2. In a seed planter, the combination of a frame, an elongated seed-carrying hopper having a bottom and end walls and also having downwardly converging side walls defining a diminished seed-delivery portion adjacent said bottom, each of said side walls having an inner side and an outer side, said end walls and one of said side walls having an elongated conveyor-receiving slot therein disposed adjacent said bottom, a pair of rotary guides journaled on vertical axes in said frame and being respectively disposed adjacent opposite ends of said hopper, one of said guides being adapted for connection with a source of rotary power, an endless drive chain trained around said rotary guides to be driven and guided thereby, said chain having links, and said chain extending along said last mentioned hopper side wall adjacent the slot therein, a seed-conveyor comprising a plurality of seed-conveyor plates, each affixed to a respective link of said chain and extending laterally outwardly therefrom and through said slots in said hopper walls, said plates being disposed in closely spaced and end-to-end relation with respect to each other, said plates having seed-receiving apertures therein which communicate with the interior of said hopper whereby to receive seeds from the hopper to be carried outwardly therefrom, delivery mechanism mounted on said frame adjacent one end of the hopper in seed-receiving relation with said conveyor plates and said delivery mechanism being constructed and arranged to deliver the seeds to the ground for planting.

3. The structure recited in claim 2 and including a removable and replaceable wear plate carried on the bottom of said hopper and in underlying and supporting relation with respect to said conveyor plates whereby to permit ready and easy replacement of the wear plate when the same has been worn by sliding of said conveyor plates thereover.

References Cited in the file of this patent

UNITED STATES PATENTS

| 650,772 | Avery | May 29, 1900 |
| 1,264,454 | Terrell | Apr. 30, 1918 |
| 2,358,208 | Braden | Sept. 12, 1944 |